(12) United States Patent
Stout et al.

(10) Patent No.: US 10,036,495 B2
(45) Date of Patent: Jul. 31, 2018

(54) COUPLING USING SEALANT FOR SEALING SECURED COMPONENTS

(71) Applicant: Mueller Industries, Inc., Memphis, TN (US)

(72) Inventors: Charles A. Stout, Collierville, TN (US); Christopher A. Mueller, Collierville, TN (US); Tommy L. Jamison, Hernando, MS (US); Marcus Robert Elmer, Cordova, TN (US)

(73) Assignee: Mueller Industries, Inc., Memphis, TN (US)

( * ) Notice: Subject to any disclaimer, the term of this patent is extended or adjusted under 35 U.S.C. 154(b) by 573 days.

(21) Appl. No.: 14/732,879

(22) Filed: Jun. 8, 2015

(65) Prior Publication Data

US 2015/0354737 A1    Dec. 10, 2015

Related U.S. Application Data (60) Provisional application No. 62/010,169, filed on Jun. 10, 2014.

(51) Int. Cl.
*F16L 21/02* (2006.01)
*F16L 13/14* (2006.01)

(52) U.S. Cl.
CPC .......... *F16L 21/022* (2013.01); *F16L 13/142* (2013.01)

(58) Field of Classification Search
CPC .............................. F16L 21/022; F16L 13/142
See application file for complete search history.

(56) References Cited

U.S. PATENT DOCUMENTS

| 3,596,939 | A | * | 8/1971 | Gibson | F16L 13/161 |
| | | | | | 285/133.21 |
| 4,277,091 | A | * | 7/1981 | Hunter | F16L 58/181 |
| | | | | | 285/369 |
| 4,371,199 | A | | 2/1983 | Kushner et al. | |
| 6,481,764 | B1 | * | 11/2002 | Kwok | B21D 39/04 |
| | | | | | 285/382 |
| 2013/0167357 | A1 | | 7/2013 | Arment et al. | |
| 2014/0062078 | A1 | * | 3/2014 | Weissmann | F16L 13/116 |
| | | | | | 285/80 |
| 2014/0197633 | A1 | * | 7/2014 | Nixon | F16L 13/142 |
| | | | | | 285/343 |

FOREIGN PATENT DOCUMENTS

| DE | 10207201 A1 | 9/2003 |
| EP | 1785657 A2 | 5/2007 |

OTHER PUBLICATIONS

Extended European Search Report and Written Opinion for Application No. 15171504.2 dated Nov. 19, 2015.

* cited by examiner

*Primary Examiner* — Benjamin F Fiorello
(74) *Attorney, Agent, or Firm* — Harness, Dickey & Pierce, P.L.C.

(57) ABSTRACT

A fitting for sealingly and fixedly coupling to a component that includes a body having a first insertion end that defines a first end face and a cavity. The cavity has an interior surface. A first seal is adapted to engage a first component when the first component is inserted through the insertion end and into the cavity. The seal extends into the cavity from the interior surface of the cavity. A band of sealant is located about a perimeter of the cavity. The band of sealant is adapted to seal the interior surface and the first component. The body is crimped around the first component to secure the fitting to the first component and seal the interior surface to the first component.

18 Claims, 6 Drawing Sheets

COUPLING USING SEALANT FOR SEALING SECURED COMPONENTS

CROSS-REFERENCE TO RELATED APPLICATIONS

This application claims the benefit of U.S. Provisional Application No. 62/010,169, filed on Jun. 10, 2014. The entire disclosure of the above application is incorporated herein by reference.

FIELD

The present disclosure relates to a coupling between two components and more particularly to a coupling that fixedly and sealingly couples two components together.

BACKGROUND

This section provides background information related to the present disclosure which is not necessarily prior art.

There has long been a need for joining two components in a manner that fixedly and sealingly couples the components to one another. One extremely common application concerns the coupling of copper tubing that is commonly employed to transmit potable water in a building.

Sweat soldering has long been used for the connection of components of copper based supply and distribution systems for potable water, especially in single family residential constructions, due to its durability and the relative ease with which lead-based solder connections could be made. Modern plumbing codes have mandated lead-free solders and water soluble fluxes and as such, the difficulty in making sweat solder connections has significantly increased, particularly where relatively large diameter copper tubing is utilized. More particularly, the lead-free solders and water soluble fluxes tend to be less tolerant of certain variables (e.g., the presence of oxidation and/or the use of excessive heat) than the lead-based solders and acid-based fluxes. Furthermore, sweat soldering can be relatively time consuming.

In an effort to eliminate the disadvantages of sweat solder connections, it has been proposed that a two-part epoxy be employed to adhesively couple the tubing and connectors to one another. More specifically, it is known to apply a two-part epoxy adhesive between a copper tube and a copper fitting (the copper fitting being suitable for coupling to the copper tube via traditional sweat soldering). Such epoxies have performed well in fixedly coupling components to one another but have not performed well in forming a seal between the components. Often, the sliding of the fitting onto the tubing (or the tubing into the fitting) can have the effect of scraping the epoxy off relatively small portions of the tubing and/or the fitting so that a void was formed therebetween. While the epoxy generally has sufficient strength to couple the fitting and the tubing together, the presence of the void rendered the joint unsuitable for its intended function (e.g., to communicate a fluid, such as potable water or a refrigerant therethrough without leaking).

The adhesive also has a set time period during which the tube and connector must be attached. In the plumbing industry, tubes and connectors may be stored for long periods of time before use, making an adhesive impractical to apply at any time other than at the time of use. Further, employing an adhesive renders a bond between the fitting and tubing. Therefore, in cases where it is desired to only bond the fitting and tubing by crimping, the adhesive poses a disadvantage.

Another connection process that has been proposed employs fittings that utilize internal seals wherein the fittings are crimped directly to lengths or sticks of conventional hard drawn copper tubing. Some examples include an inner o-ring seal that is carried on an inner diameter of the fitting and which sealingly engages the copper tubing upon insertion into the fitting. A crimping tool is subsequently employed to crimp the fitting to the tubing to thereby fixedly couple the tubing and the fitting to one another.

This system, however, is known to suffer from a drawback concerning the sealing of the fitting to an outside surface of the copper tubing. It is well known in the art that the outside surface of a copper tube is relatively susceptible to imperfections (e.g., gouges, scratches and the like) during its formation via extrusion as well as to damage during shipping and storage. As such imperfections and damage may adversely affect the ability of the fittings to seal against the outer surface of the tubing, manufacturers of the copper tubing typically subject the extruded sticks of tubing to an eddy current test to verify the integrity of each stick's outside surface. This testing is costly and as we have found, leaks are possible even when the tubing conforms to published standards. Accordingly, it appears that a relatively time consuming manual inspection must be made of each tube prior to its coupling to a fitting.

A third connection process involves threaded applications where a liquid sealant is applied to the threads as they are threaded on to the receiving portion. It is known in the art to apply liquid sealant to fill voids between male and female threads to make joints leak proof. The user must apply the sealant as the male threaded portion is threaded into the female threaded portion. This system faces a drawback where the user desires the sealant to be preapplied to a fitting for a later quick attachment of the fitting and tube. The liquid sealant does not hold a preapplied position, and, therefore, cannot be preapplied.

In view of the aforementioned known connection systems, there remains a need in the art for a connection system that can be used to fixedly and sealingly couple components together that is both reliable and relatively inexpensive.

SUMMARY

This section provides a general summary of the disclosure, and is not a comprehensive disclosure of its full scope or all of its features.

In some embodiments according to the present disclosure, a fitting for sealingly and fixedly coupling to a component may include a body that has a first insertion end that defines a first end face and a cavity. The cavity has an interior surface. A first seal may be adapted to engage a first component when the first component is inserted through the insertion end and into the cavity. The seal extends into the cavity from the interior surface of the cavity. A band of sealant is located about a perimeter of the cavity. The band of sealant is adapted to seal the interior surface and the first component. The body is crimped around the first component to secure the fitting to the first component and seal the interior surface to the first component The fitting may include a seal that is an o-ring.

The fitting may include a seal that is formed of a resilient material.

The fitting may include a body having a second insertion end defining a second end face and a cavity adapted to receive a second component.

The fitting may include a second seal that is adapted to engage a second component when the second component is inserted through a second insertion end and into a cavity. The second seal may extend into the cavity from the interior surface of the cavity.

The fitting may include a distance between a first seal and a second seal that is greater than a distance between at least one of a first insertion end and the first seal and a second insertion end and the second seal.

The fitting may include a first component and a second component that further include a plurality of imperfections. The sealant may be pressed into the imperfections when the body is crimped around the first component and the second component, forming a fluid-tight seal between the first component and the body and the second component and the body.

The fitting may include a cross-section of a cavity taken perpendicular to a longitudinal axis of an insertion end that has a circular shape.

The fitting may include a body that is formed of a metallic material.

The fitting may include a seal that is an endless member.

The fitting may include a band of sealant that is a continuous band.

In another embodiment according to the present disclosure, an assembly may include a coupling having a body. The body has an insertion end into which an internal cavity is formed. The insertion end has an end face, and the internal cavity has an interior surface. A structure has an exterior surface and is inserted into the internal cavity. A seal is disposed between the interior surface and the exterior surface. A sealant is preapplied as a continuous band around the perimeter of the internal cavity of the coupling and disposed between the interior surface and the exterior surface when the structure is inserted into the internal cavity. The coupling is crimped around the structure to fix the structure within the coupling and deform the band of sealant and the seal to form a fluid-tight engagement between the coupling and the structure.

The assembly may further include a seal that is formed of a resilient material.

The assembly may further include a seal that is an endless member.

The assembly may further include a seal that is an o-ring.

The assembly may further include a structure that is a tube.

The assembly may further include a coupling that is formed of a metallic material.

The assembly may further include a sealant that is an anaerobic sealant.

A method for forming a joint includes providing a fitting having a body, the body having an insertion end into which an internal cavity is formed, the insertion end having an end face, the internal cavity having an interior surface; providing a structure having an exterior surface including imperfections; installing a seal in the fitting such that a component engages the interior surface; applying a sealant to the internal cavity; slidingly engaging the fitting and the structure to one another such that the seal engages the structure, the sealant collecting within the imperfections on the structure as the fitting and the structure are slid together to form a band of sealant between the internal cavity and the structure that prevents leakage through a plurality of gaps between the fitting and the structure; and crimping the fitting over the structure such that the structure is fixed within the fitting.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, and/or components, but do not preclude the presence or addition of one or more other features, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
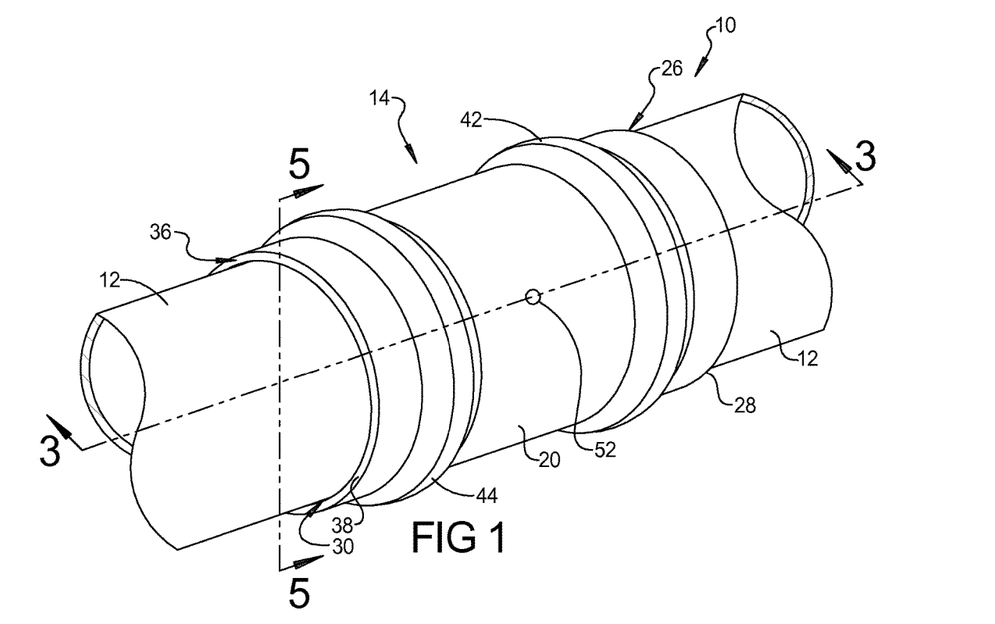
FIG. 1 is an environmental view of an assembly including a fitting and a plurality of structures in accordance with the present disclosure.

With reference to FIG. 1 of the drawings, an assembly constructed in accordance with the teachings of the present invention is generally indicated by reference numeral 10. With additional reference to FIGS. 2 and 3, the assembly 10 can include a plurality of components or structures 12, a fitting or coupling 14, and a sealant 16. The coupling 14 may be a crimp-type coupling that fixes the structure 12 within the coupling 14 by deforming the coupling 14 after the structures 12 are inserted. In the particular example illustrated, the assembly 10 is suited for use in communicating (i.e., supplying, delivering, routing) a fluid, such as a gas or liquid and as such, the structures 12 are illustrated to be a length of tubing. More particularly, the structures 12 in the particular embodiment illustrated are a length of drawn (full hard) copper tubing that is suitable for use in a system for the transmission of potable water. It will be appreciated, however, that the teachings of the present invention have broader applicability and as such, the scope of the present disclosure (and appended claims) is not limited to the particular application of the invention described and illustrated herein but rather extends to any coupling wherein the components of the coupling are fixedly and sealingly joined by a coupling or fitting 14 in the manner disclosed herein. In this regard, it will be appreciated that the structures 12 need not be tubular structures but rather could be any structure, such as a shaft, that sufficiently corresponds in size and shape to the fitting 14 so that the sealant 16 may cooperate with the two to form a sealed or fluid-tight joint or connection therebetween.

Figure 2:
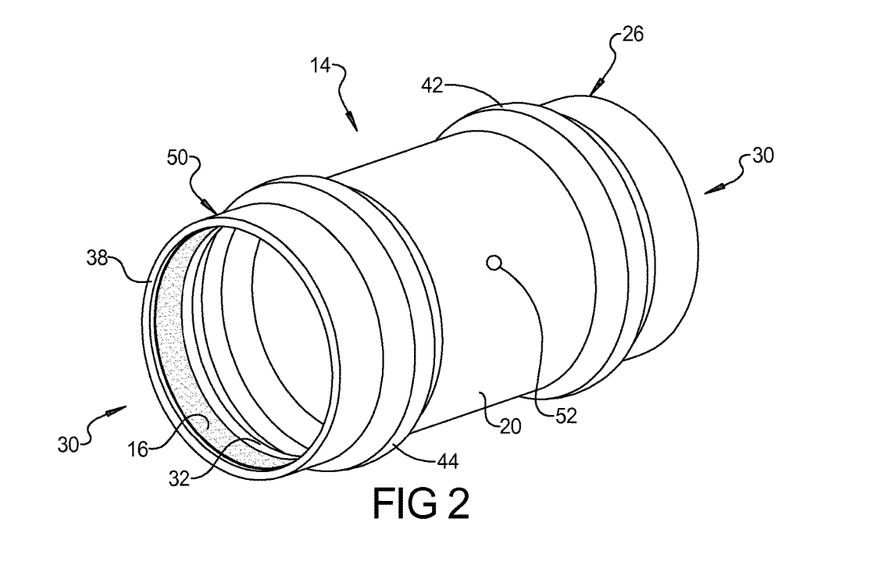
FIG. 2 is a perspective view of the fitting of FIG. 1.
Figure 3A:
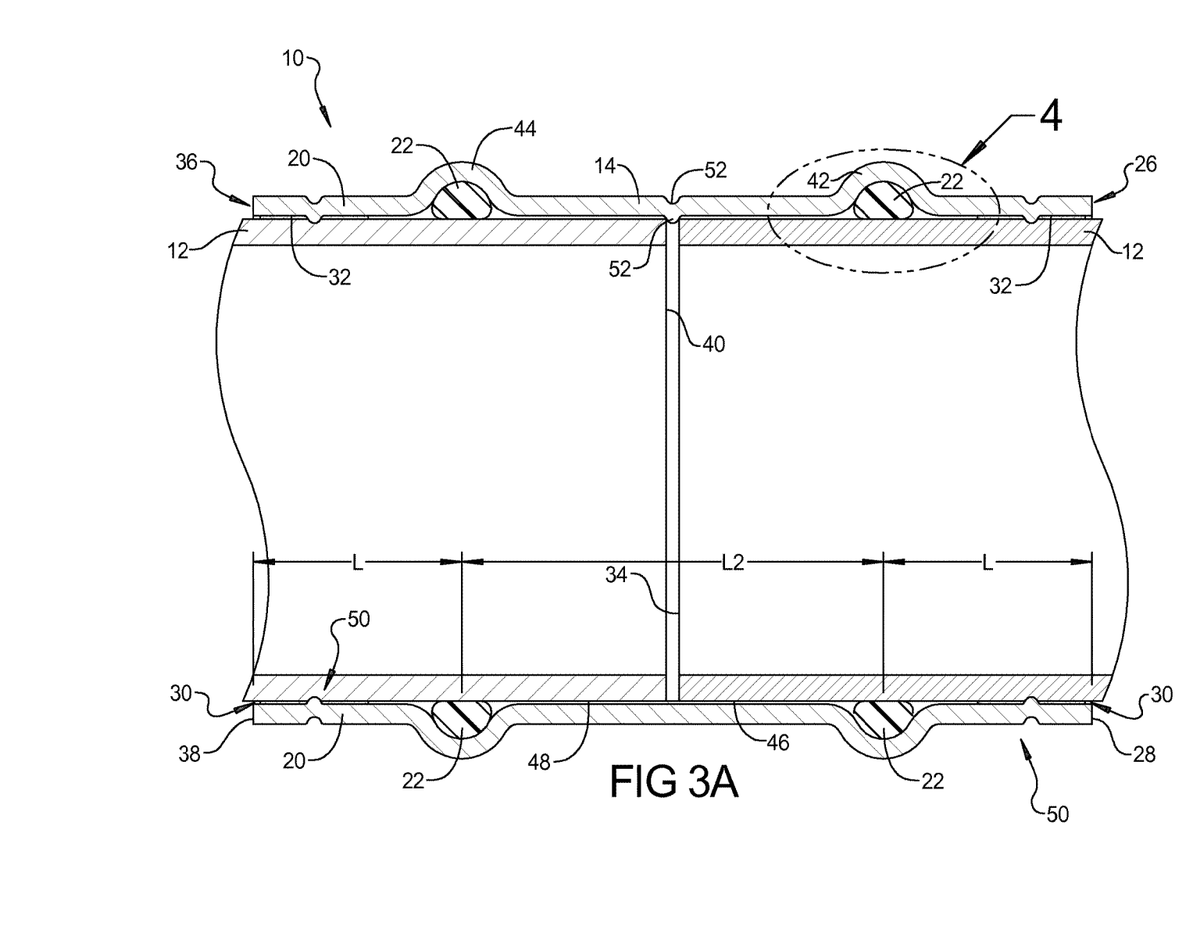
FIG. 3A is a section view of an embodiment of the fitting and structures taken at section 3-3 in FIG. 1.
Figure 3B:
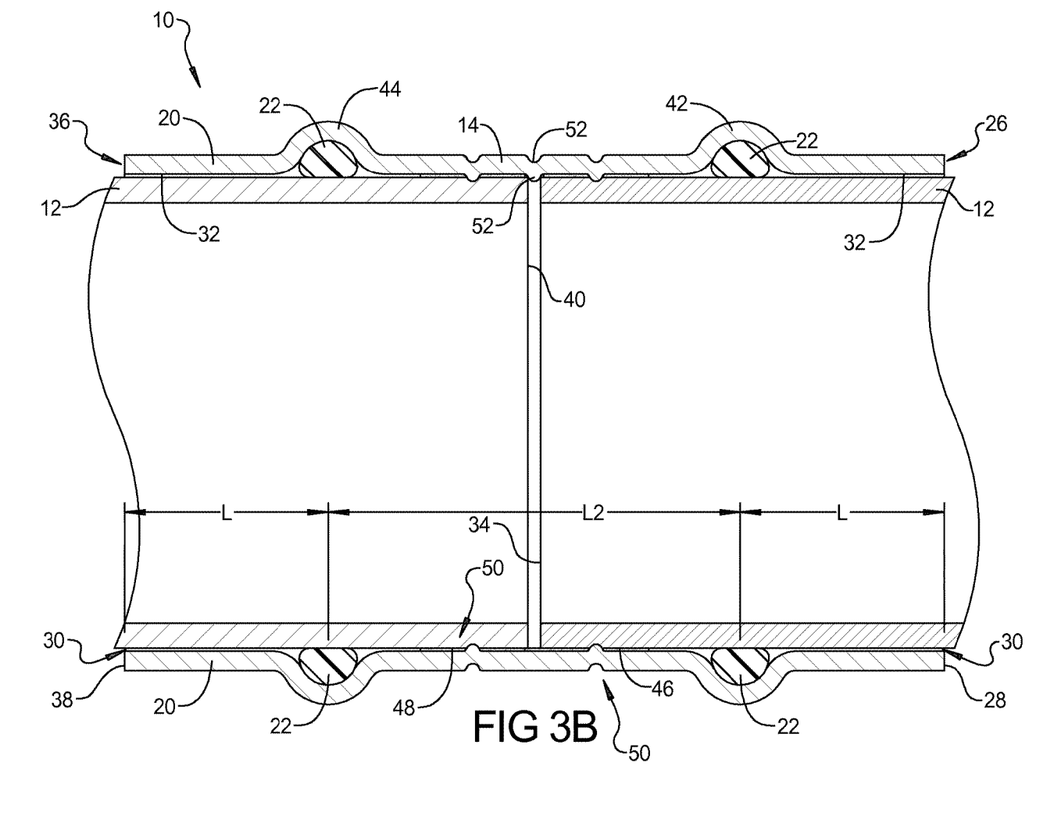
FIG. 3B is a section view of an alternative embodiment of the fitting and structures taken at section 3-3 in FIG. 1.

With reference to FIGS. 2 and 3, the fitting 14 can include a body 20 and a plurality of seals or O-rings 22. It will be appreciated that although the particular fitting illustrated is a union fitting, the teachings of the present invention have applicability to various other types of fittings, including 90° fittings, tees, caps, adapters, reducers, bushings, etc.

The body 20 can be made from any structural material, such as plastic, ceramic, copper, brass, bronze, stainless steel or another metal. In the example provided, the body 20 is made of a copper alloy so as to eliminate the potential for a galvanic reaction with the copper alloy of the structures 12. The body 20 can include a first insertion end 26 that can define a first end face 28 and a first cavity 30 having an interior surface 32. The cavity 30 can be configured to receive an associated end 34 of one of the structures 12. The body 20 can further include a second insertion end 36 that can define a second end face 38 and the first cavity 30 having the interior surface 32. The cavity 30 can be configured to receive an associated end 40 of the other of the structures 12.

Figure 4:
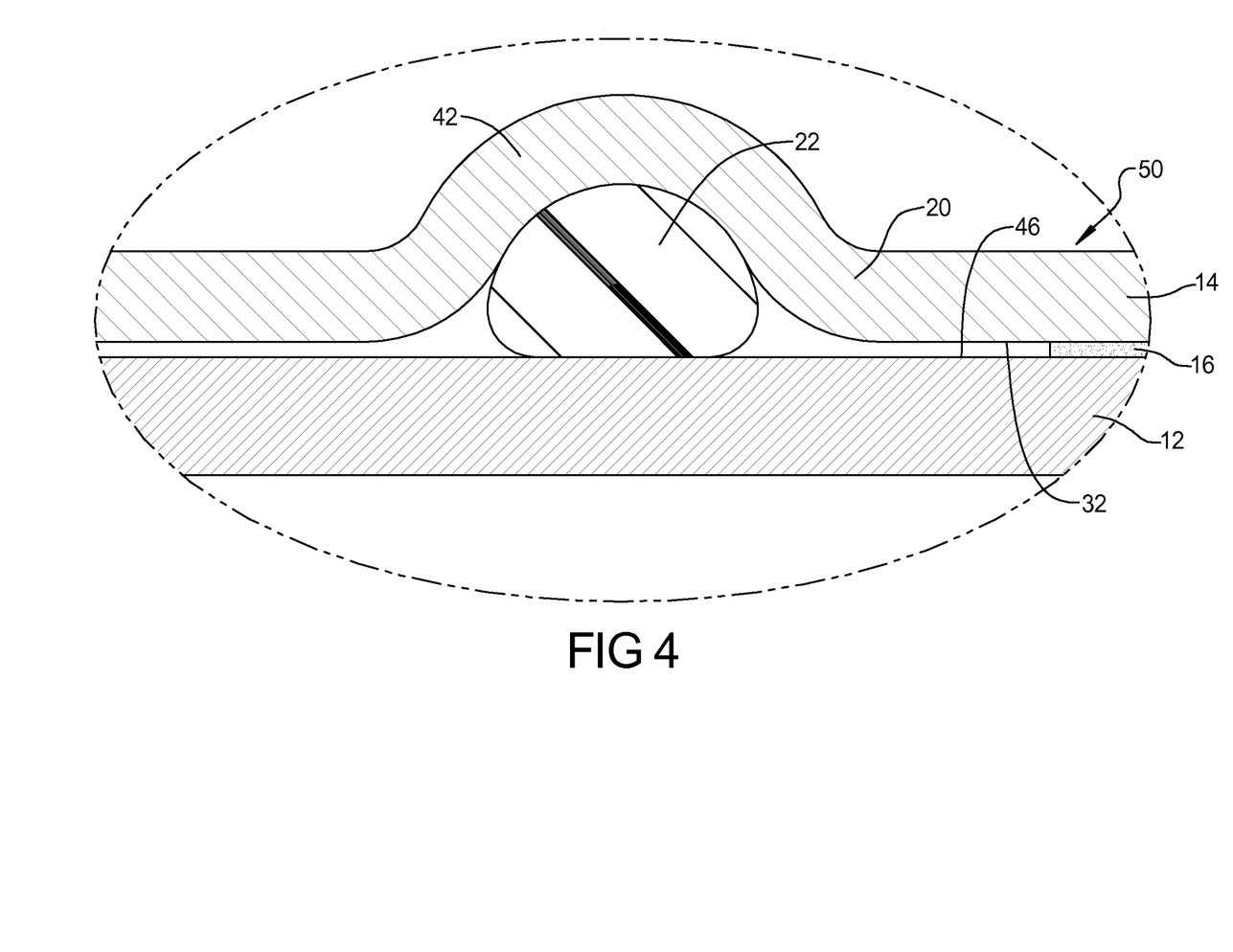
FIG. 4 is a detail view of the fitting and structures of FIG. 3A.

With additional reference to FIG. 4, the seals 22 can be housed in the body 20 in a plurality of annular indentations 42, 44 and can contact the interior surface 32 of the first cavity 30. The seals 22 can be "endless" members, such as an O-ring, and can contact the interior surface 32 in a continuous (i.e., unbroken) manner about the perimeter of the plurality of annular indentations 42, 44. Alternatively, the seals 22 could be formed in a discontinuous manner (e.g., with a plurality of voids) so as to contact the interior surface 32 in a correspondingly discontinuous manner. Moreover, the seals 22 can be formed from a resilient or deformable material.

The seals 22 can be sized to support the associated ends 34, 40 of the structures 12 within the first cavity 30 so that an exterior surface 46, 48 of the associated ends 34, 40 of the structures 12 are spaced apart from the interior surface 32 of the first cavity 30 to form a space therebetween. In the particular example provided, the seals 22 are resilient O-rings which sealingly engage the interior surface 32 and the exterior surfaces 46, 48.

With specific reference to FIGS. 3A and 3B, the seals 22 can be spaced axially apart from the end faces 28, 38 to define a coupling zone 50 having a length L. The length L of the coupling zone 50 can be selected to provide sufficient area so that the sealant 16 will be sufficiently applied to seal the structures 12 and the body 20 to one another so that the assembly 10 can be subjected to a predetermined (maximum) pressure without failure of the assembly 10. We have found that the seals 22 can be positioned axially apart from the end faces 28, 38 by an amount (i.e., length L) such that the seals maintain a minimum of two degrees deflection.

In contrast, the distance (i.e., a length L2) between the seals 22 is such that the length L is less than or equal to the length L2. Construction in this manner segregates the insertion end 26, 36 into one portion (i.e., the coupling zone 50), which is employed to sealingly and fixedly couple the body 20 to the structures 12, so that the length of the insertion end 26, 36 is used efficiently. In this regard, the lengths of the respective portions can be tailored to the specific application so as to minimize the amount of material that is employed in the body 20 and the structures 12.

The body 20 may further include a stop, cup, or protrusion, 52 to prevent insertion of the structures 12 beyond a predetermined point in the fitting 14. The protrusion 52 is located halfway between the annular indentations 42, 44 and extends below the interior surface 32 of the coupling. The protrusion 52 extends a distance such that as the structure 12 is inserted, the protrusion 52 contacts the structure 12 and mechanically prevents the structure 12 from insertion beyond the predetermined point.

The sealant 16 can be any appropriate sealant for sealingly filling in a plurality of scratches or imperfections 54 in the structures 12 and sealing the structures 12 with the body 20 to prevent fluid leakage, or fluid weeping, between the structure 12 and the fitting 14 without fixing the structure 12 to the body 20. In the particular example provided, the sealant 16 can be in the form of a paste. The sealant 16 may be an anaerobic sealant and may be of an acrylic, silicone, epoxy, polyurethane or other known material. The sealant 16 includes the characteristic of maintaining a first configuration, or first shape, when applied to the body 20 and deforming to a second configuration, or second shape, when the fitting 14 is crimped around the structure 12. When in the second configuration, the sealant 16 fills voids or gaps 56 between the fitting 14 and structure 12 created by the scratches or imperfections 54 in the structure 12. Those of ordinary skill in the art will appreciate that numerous considerations factor into the selection of a particular sealant, including density, thickness, material composition, the cost of the sealant, the chemical reactivity of the sealant, the material compositions of the structure 12 and the fitting 14, and the working temperature of the assembly. Accordingly, it will be appreciated that the sealant 16 is not limited to the particular sealants that are specifically disclosed herein or to acrylic, silicone, epoxy, or polyurethane sealants generally. In other embodiments, the sealant 16 may also be a form of suitable liquid sealant that is applied just prior to insertion of the structure 12 within the fitting 14.

Advantageously, the sealant 16 may be applied to the coupling 14 before the coupling 14 and the structure 12 are coupled to one another as illustrated in FIG. 2. Where numerous such assemblies are to be employed, it is advantageous for the sealant 16 to be preapplied to the coupling 14 because preapplying the sealant 16 will save time and reduce errors in application of the sealant 16. The interior surface 32 (FIGS. 2-3) of the cavity 30 and/or the exterior surfaces 46, 48 of the structures 12 may undergo a surface treatment, such as mechanical or chemical cleaning prior to coupling the structures 12 to the coupling 14 to promote sealing. The sealant 16 can be applied to the interior surface 32 of the cavity 30 in the coupling zone 50. In our testing, the sealant 16 was applied to the interior surface 32 in a continuous annular (circular) bead or continuous band. However, the sealant 16 may also be applied in a continuous zigzag bead (e.g., a series of several "W" shapes about the perimeter of the interior surface 32, with each "W" shape touching adjacent "W" shapes) or in a discontinuous manner (e.g., with a plurality of voids) so as the coupling is crimped around the structures 12, the sealant 16 may move or disperse along the structure 12 and coupling 14 such that the sealant 16 contacts the structures 12 and coupling 14 in a continuous manner.

Referring now to FIGS. 3A, 3B, and 4, the sealant is applied to the coupling zone 50. In an example embodiment, referring specifically to FIGS. 3A and 4, the coupling zone 50 is between the indentation 42, 44 and the end face 28, 38 (also shown in FIG. 2). In other embodiments, referring specifically to FIG. 3B, the coupling zone 50 is between the indentation 42, 44 and the protrusion 52. The sealant 16 is preapplied to the coupling zone 50, for example during the manufacturing process, at a time before the structures 12 are engaged with the coupling 14. Sometime after application of the sealant 16, the structures 12 are inserted into the coupling 14, and the coupling 14 is crimped around the structures 12 in the coupling zone 50.

Figure 5:
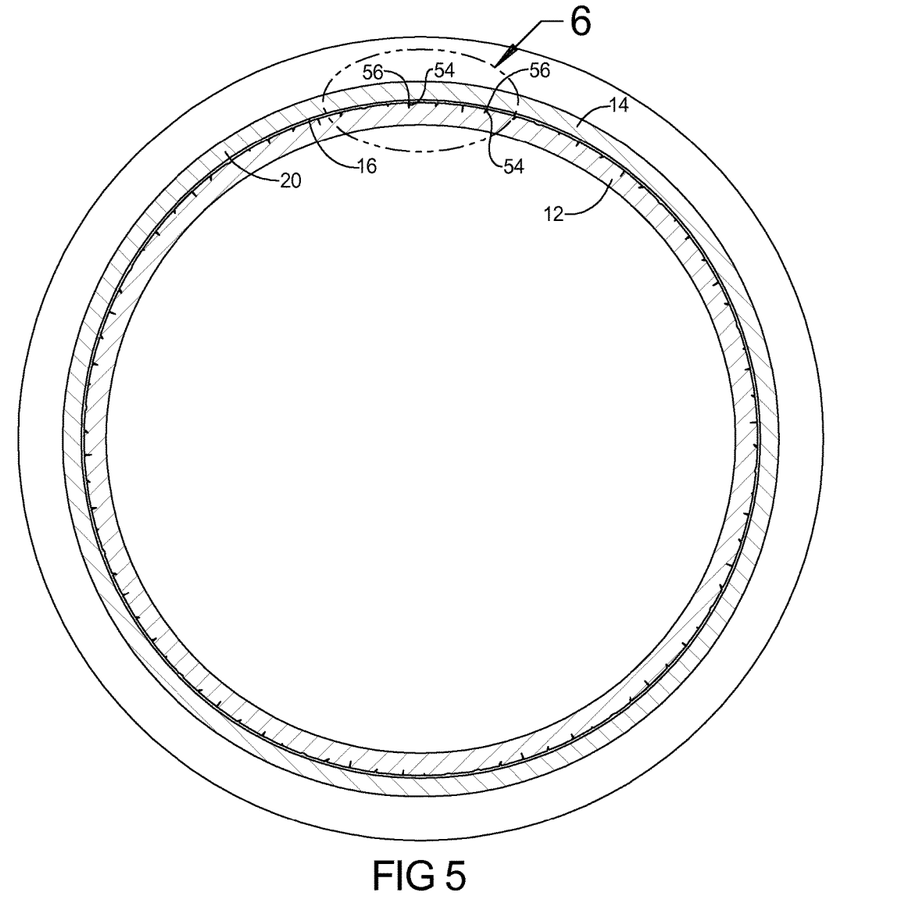
FIG. 5 is a section view of the fitting and structure taken at section 5-5 in FIG. 1.
Figure 6:
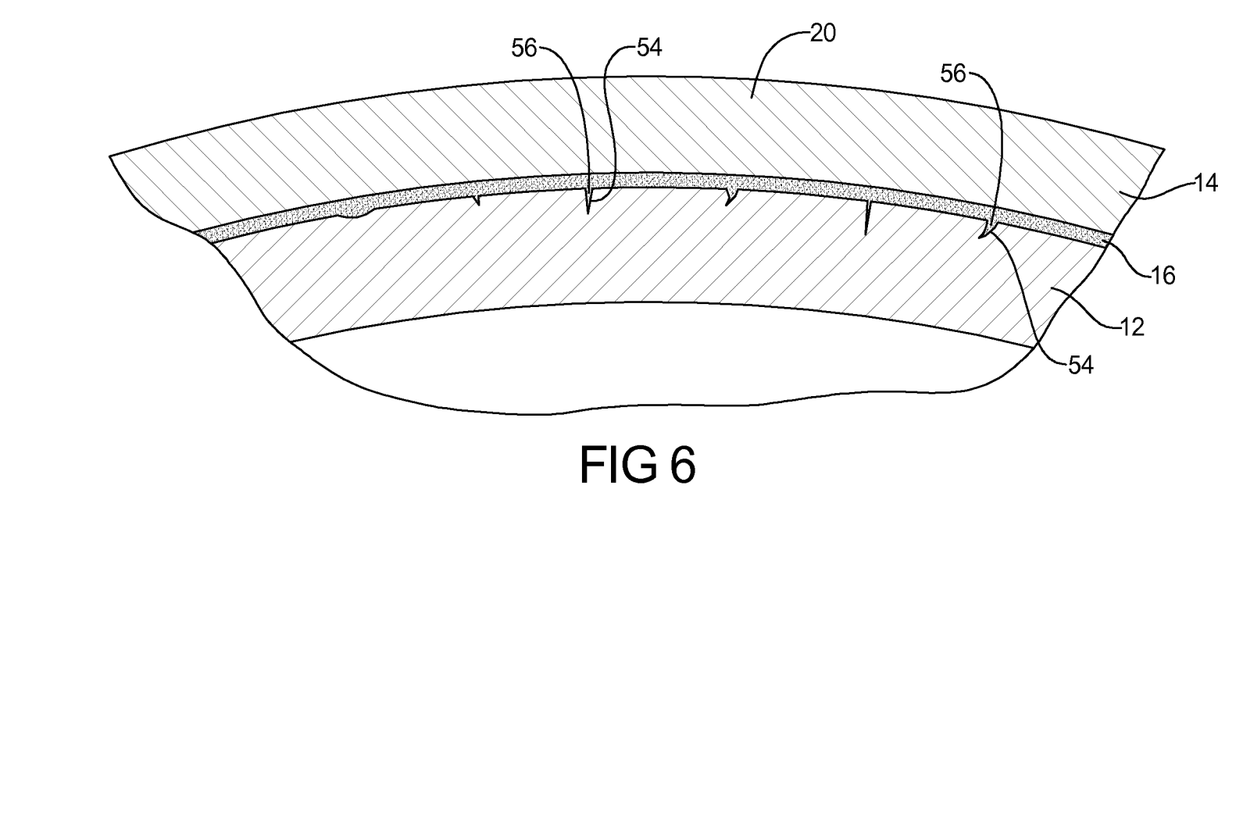
FIG. 6 is a detail view of a portion of the fitting and structures of FIG. 5.

With additional reference to FIGS. 5 and 6, the structure 12 may include imperfections, grooves, or scratches 54 incurred during manufacturing, transportation, or on the worksite. As the structure 12 is inserted into the coupling 14, the sealant 16 is forced into the imperfections 54 and fills the imperfections 54 and any gaps or voids 56 between the structure 12 and the coupling 14 to prevent fluid from passing through the imperfections 54 and out of the coupling 14. Thus, use of the sealant 16 prevents the assembly 10 from leaking fluid during fluid transportation through the structures 12.

Once the structures 12 have been inserted into the coupling 14, the coupling 14 is crimped around the structures 12 to secure the structures 12 inside the coupling 14. The sealant 16 is forced by the crimping action into any imperfections 54 in the structures 12 to promote sealing between the structures 12 and the coupling 14. In an example embodiment, the coupling 14 is crimped in the coupling zone 50 between the indentations 42, 44 and the end faces 28, 30, as illustrated in FIG. 3A. In other embodiments, the coupling 14 is crimped in the coupling zone 50 between the indentations 42, 44 and the protrusion 52, as illustrated in FIG. 3B.

Those of ordinary skill in the art will appreciate from this disclosure that the band of sealant 16 and/or the filled space between the exterior surface 46, 48 of the structure 12 and the interior surface 32 of the coupling 14 can form a positive seal between the structure 12 and the body 20. Moreover, those of ordinary skill in the art will appreciate from this disclosure that the positive seal can minimize concerns for the surface condition of the exterior surface 46, 48 of the structure 12. As noted above, crimp-type fittings rely on the formation of a seal between an exterior surface of a tube and an O-ring that is carried by a fitting. In instances where the exterior surface of the tube has been damaged (e.g., scratches, gouges and the like), the O-ring may not seal against the tube. An assembly constructed in accordance with the teachings of the present invention employs a sealant that can fill gouges, scratches and the like 54 in the exterior surface 46, 48 of the structure 12.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fitting for sealingly and fixedly coupling first and second components, the fitting comprising:
   a body having a first insertion end that defines a first end face, a second insertion end that defines a second end face, and a cavity, the cavity having an interior surface;
   first and second seals that are housed in the body and are adapted to engage the first and second components when the first and second components are inserted into the first and second insertion ends of the body, the first and second seals extending into the cavity from the interior surface of the cavity;

the first and second seals being spaced axially apart from the first and second end faces to define a coupling zone between the first and second seals; and a band of sealant preapplied in the coupling zone during the manufacturing process of the fitting that extends annularly about a perimeter of the cavity, the band of sealant adapted to create a seal between the interior surface and the first and second components, wherein the body is crimped around the first and second components in the coupling zone to secure the fitting to the first and second components and seal the interior surface to the first and second components, wherein the interior surface of the body has no sealant between the first seal and the first end face and no sealant between the second seal and the second end face.

2. The fitting of claim 1, wherein the first and second seals are o-rings.

3. The fitting of claim 1, wherein the first and second seals are formed of a resilient material.

4. The fitting of claim 1, wherein the sealant is positioned between the first seal and a protrusion in the coupling zone and between the second seal and the protrusion in the coupling zone.

5. The fitting of claim 1, wherein a distance between the first seal and the second seal is greater than a distance between at least one of the first insertion end and the first seal and the second insertion end and the second seal.

6. The fitting of claim 1, wherein the first component and the second component include a plurality of imperfections, the sealant being pressed into the imperfections when the body is crimped around the first component and the second component, forming a fluid-tight seal between the first component and the body and the second component and the body.

7. The fitting of claim 1, wherein a cross-section of the cavity taken perpendicular to a longitudinal axis of the body has a circular shape.

8. The fitting of claim 1, wherein the body is formed of a metallic material.

9. The fitting of claim 1, wherein the first and second seals are endless members.

10. The fitting of claim 1, wherein the band of sealant is a continuous band.

11. An assembly comprising:
a coupling having a body into which an internal cavity is formed, a first insertion end having a first end face, and a second insertion end having a second end face, the internal cavity having an interior surface;

first and second components, each having an exterior surface, the first and second components being inserted into the internal cavity;

first and second seals housed in annular indentations in the body that are disposed between the interior surface and the exterior surface;

a protrusion located between the annular indentations that contacts the first and second components to prevent insertion beyond a predetermined point;

the first and second seals being spaced axially apart from the first and second end faces to define a coupling zone between each of the annular indentations and the protrusion; and a sealant preapplied in the coupling zone during the manufacturing process of the coupling as a continuous band around a perimeter of the internal cavity of the coupling and disposed between the interior surface and the exterior surface when the first and second components are inserted into the internal cavity, wherein the coupling is crimped around the first and second components in the coupling zone to fix the first and second components within the coupling and deform the continuous band of sealant and the first and second seals to form a fluid-tight engagement between the coupling and the first and second components, wherein the interior surface of the coupling has no sealant between the annular indentations and the first and second end faces.

12. The assembly of claim 11, wherein the first and second seals are formed of a resilient material.

13. The assembly of claim 11, wherein the first and second seals are endless members.

14. The assembly of claim 13, wherein the first and second seals are O-rings.

15. The assembly of claim 11, wherein the the first and second components are tubes.

16. The assembly of claim 11, wherein the coupling is formed of a metallic material.

17. The assembly of claim 11, wherein the sealant is an anaerobic sealant.

18. A method for forming a joint comprising:
manufacturing a fitting having a body into which an internal cavity is formed, the body including a first insertion end having a first end face and a second insertion end having a second end face, the internal cavity having an interior surface;

providing first and second components, each having an exterior surface including imperfections;

installing first and second seals into annular indentations in the fitting such that the first and second seals are spaced axially apart from the first and second end faces to define a coupling zone between the annular indentations;

preapplying a sealant to only the coupling zone of the internal cavity during the manufacturing of the fitting such that the interior surface of the fitting between the annular indentations and the first and second end faces is free of sealant;

sliding the first and second components into the internal cavity of the fitting such that the first and second seals engage the exterior surface of the first and second components, the sealant collecting within the imperfections on the exterior surface as the fitting and the first and second components are slid together to form a band of sealant between the the interior surface of the fitting and the exterior surface of the first and second components in the coupling zone that prevents leakage; and crimping the fitting over the first and second components in the coupling zone such that the first and second components are fixed within the fitting and the sealant is pressed into the imperfections in the exterior surface of the first and second components.

* * * * *